(12) United States Patent
Arnouse

(10) Patent No.: US 9,010,645 B2
(45) Date of Patent: Apr. 21, 2015

(54) PORTABLE COMPUTING SYSTEM AND PORTABLE COMPUTER FOR USE WITH SAME

(76) Inventor: Michael Arnouse, Old Brookville, NY (US)

( * ) Notice: Subject to any disclaimer, the term of this patent is extended or adjusted under 35 U.S.C. 154(b) by 77 days.

(21) Appl. No.: 12/402,712

(22) Filed: Mar. 12, 2009

(65) Prior Publication Data

US 2011/0240728 A9    Oct. 6, 2011

Related U.S. Application Data

(63) Continuation-in-part of application No. 12/099,000, filed on Apr. 7, 2008, now Pat. No. 7,533,408, which is a continuation-in-part of application No. 10/461,303, filed on Jun. 13, 2003, now Pat. No. 7,472,275, and a (Continued)

(51) Int. Cl.
*H02B 1/00* (2006.01)
*G06K 19/06* (2006.01)
(Continued)

(52) U.S. Cl.
CPC ............ *G06F 15/02* (2013.01); *H04N 21/4143* (2013.01); *H04N 21/4181* (2013.01); *H04N 21/4183* (2013.01); *H04N 21/44236* (2013.01); *H04N 21/4424* (2013.01)

(58) Field of Classification Search
USPC .................. 235/375, 380, 487, 492, 454, 449; 726/2, 4, 9, 16, 17, 20, 21, 26, 27, 28, 726/29; 713/182, 185, 186; 380/59
See application file for complete search history.

(56) References Cited

U.S. PATENT DOCUMENTS 4,890,832 A    1/1990   Komaki
5,264,992 A   11/1993   Hogdahl et al.
(Continued)

FOREIGN PATENT DOCUMENTS

CN    1297288 A     5/2001
EP    1 486 910 A2  12/2004
(Continued)

OTHER PUBLICATIONS

Ricardo A. Barratto, Shaya Potter, Gong Su, and Jason Nieh, MobiDesk: *Mobile Virtual Desktop Computing MobiCom*, '04, Sep. 26-Oct. 1, 2004, Philadelphia, PA pp. 1-15
(Continued)

*Primary Examiner* — Daniel Hess
(74) *Attorney, Agent, or Firm* — DLA Piper LLP (US)

(57) ABSTRACT

A computing system comprising a pocket personal computer and a reader are disclosed. The pocket PC is pocket-sized and comprises flash memory, and optionally a processor and a GPS chip. The reader includes a monitor, a keyboard with docking port and an optional processor and at least one input/output USB connector. A user cannot interact with the pocket PC without the reader. The reader is a non-functioning "shell" without the pocket PC, however, when they are connected the system becomes a fully functional personal computer. To log on, a user provides security information, for example, a password or biometrics, such as fingerprints. The credit card size and capabilities of the pocket PC allows a user to easily carry virtually their entire computer in a pocket for use anywhere there is a reader. In addition, the pocket PC provides security against unauthorized use, even if lost or stolen. A password or fingerprints are required to access to the device, the circuit board may be coated with a protective coating and the system may include an RFID tag and RFID reader.

35 Claims, 6 Drawing Sheets

Related U.S. Application Data continuation-in-part of application No. 12/099,032, filed on Apr. 7, 2008, now Pat. No. 7,516,484.

(60) Provisional application No. 61/028,373, filed on Feb. 13, 2008.

(51) Int. Cl.
| | |
|---|---|
| *G06F 15/02* | (2006.01) |
| *H04N 21/4143* | (2011.01) |
| *H04N 21/418* | (2011.01) |
| *H04N 21/442* | (2011.01) |

(56) References Cited

U.S. PATENT DOCUMENTS

| | | | |
|---|---|---|---|
| 5,313,596 A | 5/1994 | Swindler et al. | |
| 5,347,425 A | 9/1994 | Herron et al. | |
| 5,367,766 A * | 11/1994 | Burns et al. | 29/848 |
| 5,436,857 A | 7/1995 | Nelson et al. | |
| 5,463,742 A | 10/1995 | Kobayashi | |
| 5,574,309 A | 11/1996 | Papapietro et al. | |
| 5,608,608 A | 3/1997 | Flint et al. | |
| 5,630,159 A | 5/1997 | Zancho | |
| 5,677,521 A | 10/1997 | Garrou | |
| 5,708,840 A | 1/1998 | Kikinis et al. | |
| 5,748,737 A | 5/1998 | Daggar | |
| 5,912,809 A * | 6/1999 | Steigerwald et al. | 361/780 |
| 5,991,838 A | 11/1999 | Swindler et al. | |
| 6,029,183 A | 2/2000 | Jenkins et al. | |
| 6,029,215 A | 2/2000 | Watts, Jr. et al. | |
| 6,216,185 B1 | 4/2001 | Chu | |
| 6,267,673 B1 | 7/2001 | Miyamoto et al. | |
| 6,493,020 B1 | 12/2002 | Stevenson et al. | |
| 6,532,152 B1 * | 3/2003 | White et al. | 361/692 |
| 6,538,880 B1 | 3/2003 | Kamijo et al. | |
| 6,583,982 B2 | 6/2003 | Mancini et al. | |
| 6,636,918 B1 | 10/2003 | Aguilar et al. | |
| 6,668,318 B1 | 12/2003 | Jenkins et al. | |
| 6,718,415 B1 | 4/2004 | Chu | |
| 6,999,792 B2 | 2/2006 | Warren | |
| 7,120,462 B2 | 10/2006 | Kumar | |
| 7,328,333 B2 | 2/2008 | Kawano et al. | |
| 7,346,689 B1 | 3/2008 | Northcutt et al. | |
| 7,370,350 B1 | 5/2008 | Salowey | |
| 7,477,919 B2 | 1/2009 | Warren | |
| 7,515,471 B2 * | 4/2009 | Oh et al. | 365/185.11 |
| 7,647,491 B2 | 1/2010 | Kawano et al. | |
| 2001/0000405 A1 * | 4/2001 | Gray et al. | 235/375 |
| 2001/0019343 A1 | 9/2001 | Walker et al. | |
| 2001/0034250 A1 * | 10/2001 | Chadha | 455/566 |
| 2001/0043513 A1 | 11/2001 | Grupp | |
| 2002/0074413 A1 * | 6/2002 | Henzerling | 235/492 |
| 2002/0097555 A1 | 7/2002 | Smith et al. | |
| 2002/0100810 A1 * | 8/2002 | Amadeo | 235/492 |
| 2002/0146662 A1 * | 10/2002 | Radl et al. | 433/90 |
| 2002/0146862 A1 * | 10/2002 | Wark | 438/108 |
| 2002/0153414 A1 * | 10/2002 | Stoutenburg et al. | 235/379 |
| 2003/0042316 A1 * | 3/2003 | Teraura | 235/487 |
| 2003/0078749 A1 * | 4/2003 | Eberle et al. | 702/80 |
| 2003/0150915 A1 * | 8/2003 | Reece | 235/449 |
| 2003/0178495 A1 * | 9/2003 | Jones et al. | 235/492 |
| 2003/0198015 A1 | 10/2003 | Vogt | |
| 2003/0212862 A1 * | 11/2003 | James | 711/115 |
| 2004/0109563 A1 * | 6/2004 | Evans et al. | 380/227 |
| 2004/0122888 A1 * | 6/2004 | Carmichael | 709/200 |
| 2004/0249990 A1 | 12/2004 | Yin | |
| 2004/0255081 A1 * | 12/2004 | Arnouse | 711/115 |
| 2005/0007835 A1 * | 1/2005 | Lee et al. | 365/189.12 |
| 2005/0129385 A1 * | 6/2005 | Speasl et al. | 386/46 |
| 2005/0169467 A1 * | 8/2005 | Risan et al. | 380/201 |
| 2005/0270731 A1 | 12/2005 | Yin | |
| 2006/0060101 A1 | 3/2006 | Nasser | |
| 2006/0067054 A1 * | 3/2006 | Wang et al. | 361/704 |
| 2006/0075342 A1 | 4/2006 | Penning | |
| 2006/0126408 A1 * | 6/2006 | Bucksch | 365/200 |
| 2006/0136656 A1 * | 6/2006 | Conley et al. | 711/103 |
| 2006/0146017 A1 | 7/2006 | Leung et al. | |
| 2006/0208350 A1 | 9/2006 | Poo et al. | |
| 2007/0028138 A1 * | 2/2007 | Noya et al. | 714/6 |
| 2007/0070188 A1 | 3/2007 | Shyu | |
| 2007/0087725 A1 | 4/2007 | Anderson | |
| 2007/0222758 A1 | 9/2007 | Mulcahy et al. | |
| 2007/0279996 A1 * | 12/2007 | Rolandi et al. | 365/185.22 |
| 2008/0002350 A1 | 1/2008 | Farrugia | |

FOREIGN PATENT DOCUMENTS

| | | |
|---|---|---|
| WO | 94/14128 | 6/1994 |
| WO | WO 99/54804 A2 | 10/1999 |

OTHER PUBLICATIONS

Muneeb Ali and Loen Langendoen, *Tiny PC: Enabling Low-Cost Internet Access in Developing Regions*, NSDR '07, Aug. 27, 2007, Kyoto, Japan, (6 pages).

Brad A. Myers, *Using Handhelds and PCs Together*, Nov. 2001, vol. 44, No. 11, Communication of the ACM, pp. 34-41.

Kvitka, Andre, "Moby Brick Succeeds with Unique Form of Portability," InfoWorld; Oct. 21, 1991; 13, 14; ProQuest Central p. 130.

"*PowerBook Duo Dock User's Guide for the PowerBook Dock and Duo Dock II*." Apple Computer, Inc., 1993.

"Defendant Motorola Mobility, Inc's Response to Arnouse's Infringement Contentions," Case No. 5:11-cv-155-CR *Arnouse Digital Devices Corp.*, v. *Mortorola Mobility, Inc.*, Apr. 16, 2012.

"Appendix A—Defendant Motorola Mobility, Inc.'s Responses to Plaintiff's Claim Chart for Alleged Infringement of Claims of US Patent No. 7,516,484."

"Plaintiff's Infringement Contentions," Case No. 5:11-cv-155 *Arnouse Digital Devices Corp.*, v. *Motorola Mobility, Inc.*, Mar. 26, 2012.

"Defendant Motorola Mobility Inc.'s Preliminary Invalidity Contentions," Case No. 5:11-cv-155-cr *Arnouse Digital Devices Corp.*, v. *Motorola Mobility, Inc.*, Apr. 16, 2012.

"Exhibit 1: Claim Chart for US Patent No. 7,516,484: Claims 1, 3, 7, 15, 16, 18 and 20."

"Exhibit 2: Claim Chart for US Patent No. 7,516,484: Claims 1, 3, 7, 15, 16, 18 and 20."

"Exhibit 3: Claim Chart for US Patent No. 7,516,484: Claims 1, 3, 7, 15, 16, 18 and 20."

"Exhibit 4: Claim Chart for US Patent No. 7,516,484: Claims 1, 3, 7, 15, 16, 18 and 20."

"Exhibit 5: Claim Chart for US Patent No. 7,516,484: Claims 1, 3, 7, 15, 16, 18 and 20."

"Exhibit 6: Claim Chart for US Patent No. 7,516,484: Claims 1, 3, 7, 15, 16, 18 and 20."

"Exhibit 7: Claim Chart for US Patent No. 7,516,484: Claims 1, 3, 7, 15, 16, 18 and 20."

"Exhibit 8: Claim Chart for US Patent No. 7,516,484: Claims 1, 3, 7, 15, 16, 18 and 20."

"Complaint for Patent Infringement and Demand for Jury Trial," Case No. 5:11-cv-155 *Arnouse Digital Devices Corp.*, v. *Motorola Mobility, Inc.* Jun. 16, 2011.

United States Patent and Trademark Office, Before the Patent Trial and Appeal Board, *Motorolas Mobility LLC* v. *Michael Arnouse*, Case IPR2013-00010 (MT) Patent 7,516,484.

Canadian Examination Report issued on Oct. 17, 2013 in corresponding Canadian Application No. 2,717,989.

Final Written Decision, *Motorola Mobility LLC* v. *Arnouse Digital Devices Corporation and Michael Arnouse*, Case IPR2013-00010 Patent 7,516,484, Feb. 11, 2014.

\* cited by examiner

PORTABLE COMPUTING SYSTEM AND PORTABLE COMPUTER FOR USE WITH SAME

CROSS-REFERENCE TO RELATED APPLICATIONS

This application is a continuation-in-part of U.S. application Ser. No. 12/099,000, filed Apr. 7, 2008 now U.S. Pat. No. 7,533,408, which is a continuation-in-part of U.S. application Ser. No. 10/461,303, filed on Jun. 13, 2003 now U.S. Pat. No. 7,472,275, and is a continuation-in-part of U.S. application Ser. No. 12/099,032, filed Apr. 7, 2008 now U.S. Pat. No. 7,516,484, which claims priority to U.S. Application Ser. No. 61/028,373, filed Feb. 13, 2008.

FIELD OF THE INVENTION

The present invention relates to computing systems and in particular to a portable computer that is small in size so as to be easily carried, and yet have the capabilities of a conventional large scale computer, and also secure to address concerns as to data theft and corruption.

BACKGROUND

Computers have historically been large in size based on the components required for providing sufficient computing capabilities, such as mainframe computers. With the advent of personal computers, computers which once would fill the size of a room were able to be reduced down in size so as to be contained within a single desktop device. However, desktop computers which require a large tower to house the processing components, a monitor and keyboard are not conducive to be taken from place to place. Instead, laptop computers were developed to contain the computer processing capabilities, monitor and keyboard within a smaller unitary package, in order to allow transport from place to place. However, laptop computers are still fairly large in size and also sacrifice quality as compared to desktop computers. Moreover, desktop, laptop and mainframe computers all suffer from being susceptible to data corruption from viruses or worms, and also to data theft from hackers. While computers need to be immune to these threats, they also need to be portable and convenient to use easily almost anywhere.

There is a need for a computing system that is portable, can be used in a number of different applications, and protects sensitive information. The present invention provides a computing system that satisfies these needs and provides additional advantages.

SUMMARY

The present invention comprises, in an exemplary embodiment, a hand-held sized, portable computer and a computing system comprised of at least one portable computer and at least one reader configured to interact with portable computers. The portable computer has all of the components of a fully functional conventional, general purpose computer. The portable computer is small in size. In one embodiment, it is the size of a credit card. In other embodiments, it is the size of multiple credit cards stacked on top of one another. In yet further embodiments, it is encased and about 85 mm by about 55 mm by about 5 mm. The foregoing dimensions allow the portable computer to be easily carried in a wallet or one's pocket. Various embodiments provide the versatility of a "Pocket PC" with the advantages and capabilities of a traditional computer. For example, the portable computer is easily transportable and the portable computer reader provides use of a full computer with a full-sized screen, keyboard, etc.

In certain embodiments, the portable computer is operable only when used with a reader. The portable computer reader supplies the means for a user to interact with the portable computer and the programs thereon; for example, the portable computer reader can comprise a monitor and/or a keyboard. In essence, the portable computer reader is a non-functioning "shell" when not connected to the portable computer. However, once the portable computer is connected to the portable computer reader, the portable computer and the portable computer reader create a fully operational computing system. The portable computer thus acts as the brain and the portable computer reader operates as the body which will perform the functions, however, without the brain, the body will do nothing.

When a user is finished, he or she simply removes the portable computer and can take it with him or her. Because the portable computer reader is a shell, none of the user's information is left behind. All cookies, keystrokes, downloaded files, etc. remain with the portable computer. Thus, various embodiments do not make any information, including sensitive information, available to subsequent users of the portable computer reader. In addition, there is virtually no danger that the portable computer reader could be affected by a computer virus for this same reason, as there is no capability for the portable computer reader to retain any data from a previous person's use. As a result, the applications for the portable computer are almost limitless where security and privacy of content is a concern, and where there may be concern of corruption by viruses or worms. For example, applications include, but are not limited to, hotels, internet cafes or other public locations, such as libraries or universities, etc.

The portable computer comprises additional levels of security. For example, in one embodiment, components of the printed circuit board of the computer are coated with a coating. The coating may make the components brittle, causing them to break when they are tampered with. The coating may make the components sticky, making it extremely difficult to remove them from the PCB. In addition, in other embodiments, the PCB and other components of the portable computer are encased within a rigid casing. Finally, the portable computer may comprise an RFID tag configured to interact with an RFID reader of the computing system. The RFID reader and/or RFID tag make a loud audible sound or trip a "silent alarm" when the portable computer is moved to or located in an impermissible location, for example, where an unauthorized user attempts to move the portable computer from a location containing multiple computer readers.

Finally, in certain embodiments, the portable computer may comprise one or more flash memory devices or flash drives. A flash drive is a storage device that uses flash memory rather than conventional spinning platters to store data. Advantages of using flash memory or flash drives with the portable computer is that there is little delay time when starting up, such as is the case when booting conventional computers. Also, flash memory is non-volatile, which means that it does not need power to maintain the information stored in the device. As a result, the portable computer requires only low power for operation, which can be readily supplied by batteries or similar low power sources, such as solar cells. The flash memory can also be tailored to provide as much storage capacity as may be desired depending on the particular application.

DETAILED DESCRIPTION

The following embodiments of the invention may be implemented using hardware or software or any combination of the two where desired. Various embodiments may also be implemented using commercially available technology.

The invention comprises, in various embodiments, a portable computer, which may be referred to as a "Pocket PC." The invention also comprises a computing system having at least one portable computer and one or more portable computer readers. Versions of the portable computer, computing system and method of using same are shown and described in Applicant's co-pending application Ser. No. 12/099,000, which is incorporated by reference. Versions of the computer readers and method of using same are described in Applicant's co-pending application Ser. No. 12/099,032, which is also incorporated by reference. Applicant's co-pending patent application Ser. No. 10/461,303, which is incorporated by reference, also describes various embodiments of a portable computer, computing system and method.

Figure 1:
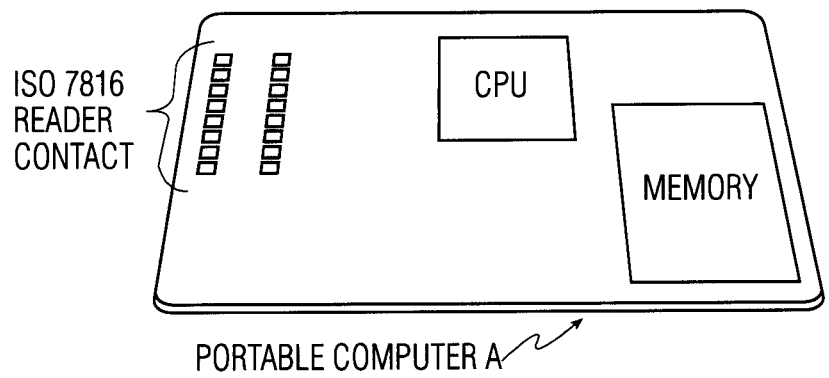
FIG. 1 is a perspective view of an embodiment of a portable computer according to the present invention.
Figure 2:
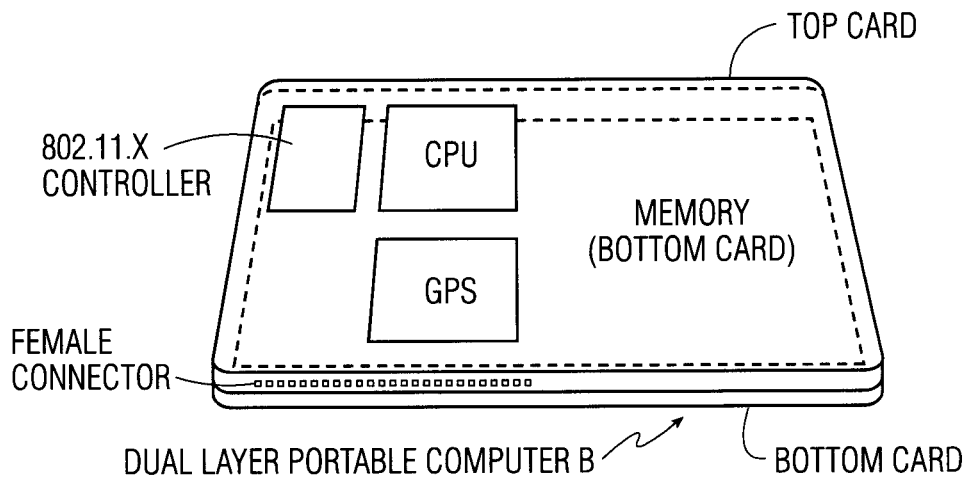
FIG. 2 is a perspective view of another embodiment of a portable computer according to the present invention.
Figure 3:
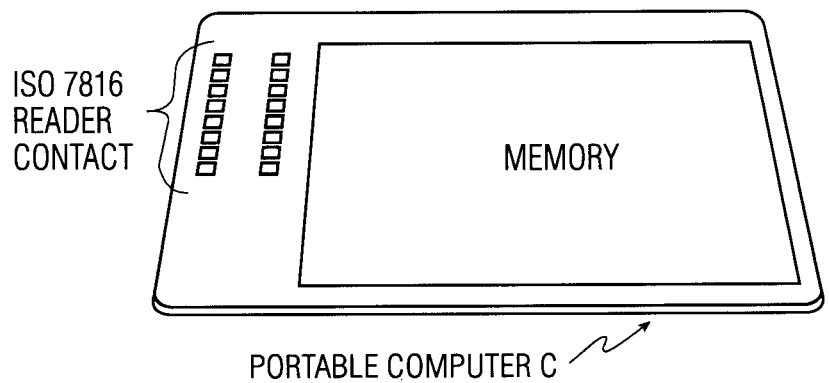
FIG. 3 is a perspective view of another embodiment of a portable computer according to the present invention.

As illustrated in FIGS. 1-3, in one exemplary embodiment, the portable computer comprises a card, preferable the size of a credit card so as to be easily carried in one's pocket or wallet. The portable computer reader, shown in FIGS. 4-7, comprises a reader, which is described in more detail below. The portable computer readers may comprise a main docking station that is a computer keyboard and monitor, phone or cell phone. Any of the portable computer readers may also include a card reader and/or a biometric reader, as described in more detail below.

In one embodiment, the portable computer is hand-held, transferable, removable and portable. As provided above, the computer may be a card. As shown in FIG. 1, in one embodiment ("Portable Computer 'A'"), the computer is a card with a CPU, reader contacts and memory. As shown in FIG. 3 ("Portable Computer 'C'"), in another embodiment, the computer may comprise only a memory and reader contacts. All of the components shown in FIGS. 1 and 3 may be on a surface of the card, preferably, embedded thereon, or may be internally within the card. The cards have embedded integrated circuits which can process information. This implies that the computer can receive input which is processed—by way of the ICC applications—and delivered as an output.

The card may be of any desired size and thickness, which may also be attributed to desired capabilities and technologies used, such as memory/storage requirements. Dimensions are normally credit card size. The card may meet ID-1 of ISO/IEC 7810 standard, which defines card size as 85.60×53.98 mm. Thus, the card is generally no larger than approximately 90 mm by 60 mm and no greater than approximately 80 mm thick. The card may be other sizes such as ID-000 which is 25×15 mm. The card may be about 0.76 mm thick. The card may also have at least one means for attaching the card to a rope, chain, string, etc. for easy transportation. Such means may be a hole or opening in the card or a hook or fastener attached to the card.

As shown in FIG. 2 ("Dual Layer Portable Computer 'B'"), in one embodiment, the computer comprises at least two cards connected. Preferably, the cards are stacked one on top of the other but may be connected in other ways. The cards may be credit card sized, as described above. The cards may be stacked directly on top of one another or there may be a space between that may hold computing components. The top card may comprise a controller, CPU and GPS and a female connector on an edge. It may also comprise additional elements such as a GPS chip, processor, RFID crypto memory, logic element, specialized reader contact, controller, microprocessor, and means for interacting with the portable computer readers, such as pins, USB, etc. The bottom card may comprise all memory. It would be understood that the cards may comprise different elements than shown. In another embodiment, shown in FIGS. 9 and 10, the portable computer contains its computing components within a housing so that the physical components are not easily removable from the portable computer. In this embodiment, the computer is preferably a box or rectangular prism but may take other shapes. The portable computer may take other forms larger or smaller than a credit card, for example, a compact disc, cell phone, PDA, Smartphone, etc. Either card may also have at least one means for attaching the card to a rope, chain, string, etc. for easy transportation. Such means may be a hole or opening in the case or a hook or fastener attached to the card.

Regardless of the form of the computer, in the embodiments shown in FIGS. 1 and 2, the portable computer may contain all of the components of a fully functional, conventional general purpose computer but, generally, is without means for interacting with the computer, as described below. "General purpose computer" means that the computer contains sufficient hardware and software that will enable a user to do many different things with the computer such as type documents, send e-mail, browse the Internet and play games. In the embodiment shown in FIG. 3, the portable computer comprises only a memory and ISO 7816 reader contacts for connecting to the portable computer readers.

As shown, at the least, the portable computer's components include a main or primary memory and a connector for connecting to a reader. The connector may be a female connector for receiving pins. The connector may be comprised of a grid of conductive targets on a printed circuit board (see e.g., FIGS. 9 and 10). The targets may be coated with a non-corrosive plating to prevent excessive wear on the targets from repeated contact with the connector of the reader. The reader may comprise the connector body so that the portable computer need only comprise a pattern of plated, copper pads to complete the electrical connection to the reader. The portable computer connector may be gold plated.

As provided above, the portable computer may comprise at least one storage component such as memory. Two classes of solid state memory (i.e., hard drive-type storage) may be available. The memory may be a multi-level cell and a single-level cell. The storage component may also be volatile memory. The volatile memory may be a dynamic random access memory. The dynamic random access memory may be DDR2. The DDR2 memory may support processors of speeds of about 400 MHz and about 533 MHz. In one embodiment, the portable computer comprises both volatile and solid state memory.

A controller may be incorporated into the portable computer to increase the transfer rate. The portable computer may also comprise a dynamic memory. A central processing unit ("CPU") may reside in the card or the portable computer reader. For example, where minimal processing capabilities may be required, the CPU may readily be accommodated within the computer card. In addition, in embodiments where significant processing capabilities are desired, a larger sized CPU may be preferred, which may be easier to accommodate by locating the CPU in the portable computer reader, such as in the keyboard and/or monitor. Alternatively, the CPU may be located in the computer reader, as described below.

The CPU is preferably a microprocessor as is known in the art. The CPU, preferably, is designed for portability. As such, it may include 800 MHz of speed so that it uses less power, for example, 0.65 watts and is built to run without active cooling such as a fan. Such a processor may be an "ATOM" processor from INTEL®. The ATOM processors used may be the Z500, Z510, Z520, Z530 and Z540 and subsequent versions. The processor may be available in a 441 pin FCBGA package. The processor may be procured in bare die form and placed as a "flip chip." The combined die-solder package will reduce the processor height to about 0.48 mm. A System Controller Hub may be available in a 1249 pin flip chip ball grid array (FCBFA) package with a height about 2.1 mm. Reducing the package to a bare die leaves a vertical height of about 0.9 mm. The main memory is accessible to the CPU. In one embodiment, there are levels of storage and the primary storage is accessible only to the CPU. The primary storage may comprise processor registers and cache, ROM, as well as BIOS, RAM, magnetic or optical storage. The primary memory may be volatile or non-volatile. The portable computer may also have a non-volatile, read-write, secondary storage, which may not be readable by the CPU. Secondary storage may comprise a hard drive or optical storage devices, such as CD and DVD drives, flash memory (e.g. USB sticks or keys), floppy disks, magnetic tape, paper tape, standalone RAM disks, and ZIP drives. Preferably, the secondary storage is formatted according to a file system format. Where the portable computer is desired to be particularly small, it may not contain a hard drive. Rather, it may contain only ROM and/or RAM, wherein the RAM may be a flash drive.

Loaded onto the memory, preferably, onto the RAM, is software that is executed in the central processing unit. Such software may include application software such as word processors, system software such as operating systems, which interface with hardware to provide the necessary services for application software, and middleware which controls and coordinates distributed systems. The applications may also include control applications. Control applications enable the portable computer to generate control signals interpretable by the portable computer reader, which is explained in more detail below. Control applications may generate a user interface on a display of the portable computer reader and receive user inputs into the portable computer reader by means of the input/output devices in the portable computer reader, which are shown in FIGS. 4-7 and described below. The control applications translate the user inputs into control signals provided to the portable computer reader.

The system software may include device drivers, diagnostic tools, servers, windowing systems and utilities. In one embodiment, the portable computer comprises the hardware necessary to run the aforementioned software. In other embodiments, this hardware is a part of the portable computer reader. Application software may include business software, educational software, medical software, databases, word processing software and computer games. The software includes an operating system such as Microsoft Windows® or Windows Mobile, NetBSD, Mac OS X, Linux, Palm OS or Windows Mobile. Where the processor is an ATOM™ processor, the portable computer may support Mac OS X. The operating system may be capable of using the TCP/IP networking protocols, has a graphical interface and device drivers. The operating system may be placed on the portable computer by the manufacturer or later downloaded by the user. Synchronization can be performed using the operating system's intrinsic tools. This will transfer user parameters, data files, e-mail settings, etc. to the portable computer. The capacity and speed of each core unit can be made compatible with the state-of-the-art computer science as with the enclosures used.

The portable computer may also comprise, but is not limited to, various activation means, a video display controller, SCSI controller, video card, a graphics processing unit, graphics card, graphics chip, sound card, sound interface such as an AC97 interface, sound producing means, input/output controller means, PCMCIA controller, a graphics controller and a serial controller, a power source, which may include an electrical transformer that regulates the electricity used by the computer and means for communication with outside sources of data and information. Preferably, the aforementioned components (CPU, RAM, hard drives, etc.) are attached to a motherboard. The motherboard or circuit board may be a printed circuit board comprising a plurality of stacks. In one embodiment, the printed circuit board is an 8 layer stackup. The PCB may be about 0.075 mm in width. Optimal trace impedance for high-speed traces; e.g., memory and front-side bus, USB, LVDS, etc. is about 50'Ω to about 100'Ω. With a per-layer thickness of about 0.11 mm, the overall stack-up thickness of the portable computer may be about 0.77 mm. The motherboard may also include a PCI or a planar device for attaching peripheral devices to the motherboard or devices located on or in the portable computer reader. All of the aforementioned components (CPU, RAM, hard drives, etc.) may be attached to a motherboard. The motherboard may be within the portable computer or may be within the portable computer reader.

The portable computer may also comprise a GPS chip, a specialized reader contact, a logic element, a smart card device, and/or RFID crypto memory. The specialized reader contact is the interface to the ports/card readers' specialized readers. It may utilize ISO-7816 pattern locations for interface to the single chip smart card microprocessor, and AFNOR pattern locations for interface to the logic element. The logic element acts as the "policeman" of the card. It directs message traffic and interrogates readers and secure keys to allow access to the compartmentalized data contained in the flash memory. This device may interact with the smartcard chip and the GPS device over SPI communication links. Only if the correct security is met will data access be allowed. The RFID crypto memory may comprise an ISO 14443 compliant contact-less RFID. This allows for expanded use of the card in proximity ID applications. For example, the portable computer may communicate with the reader in a contactless manner, via the RFID. The subsystem is powered up in the presence of an ISO 14443 compliant reader (or, the portable computer reader could be such a reader). Limited duplicate data is stored in encrypted form in CryptoRF memory for access by RFID systems employing the standard protocol. The smart card device is a specifically designed secure micro controller targeted for the existing smart card market, such as produced by ATMEL. The device runs specific application software that allows for standard smartcard, javacard, and secure partitioning control.

To provide a suitably fast boot scenario; e.g., about 15 seconds boot time, the portable computer may use a technique to accelerate startup time. When instructed to shut down, the portable computer may save the contents of its volatile memory to flash in a hibernation process. This process is supported in Windows operating systems, as example. To restart, the portable computer needs only to reload the contents of its memory; a process which generally takes less than about 10 seconds.

Figure 9:
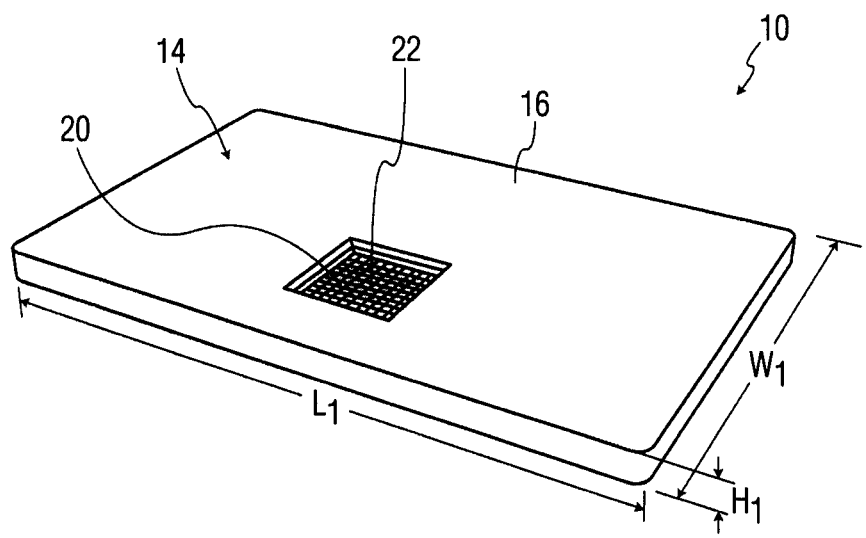
FIG. 9 is a perspective view of another embodiment of a portable computer according to the present invention.
Figure 10:
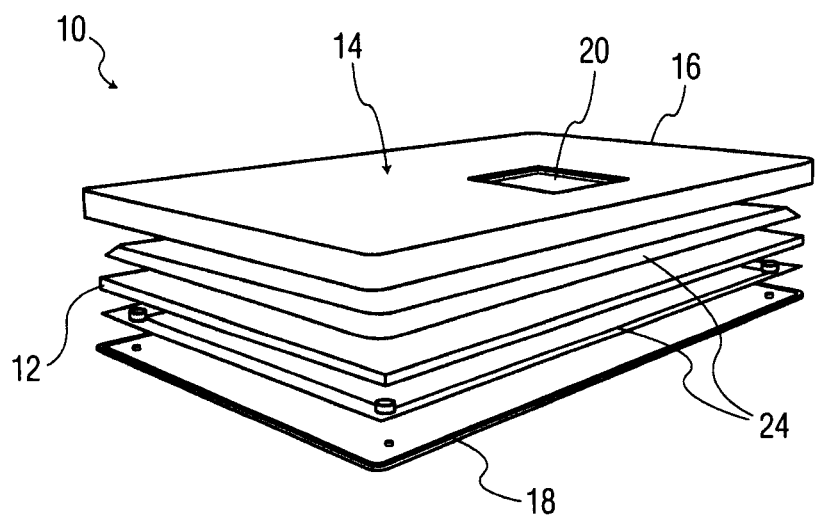
FIG. 10 is an exploded view of the portable computer shown in FIG. 9.

Any version the portable computer may be encased in a housing. FIGS. 9 and 10 show the embodiment of the portable computer 10 comprised of a printed circuit board 12 having an eight (8) stack-up configuration. Even though an eight stack-up configuration is shown, more or less stack-ups may be used. The portable computer is encased in a rigid housing 14. As shown in FIG. 10, the rigid housing 14 "sandwiches" the printed circuit board 12 and electronic components within two casing portions 16, 18. As explained below, the printed circuit board (or any portion thereof) may be coated with at least one coating 24, which is shown in FIG. 10. The casing portions 16, 18 may be comprised of virtually any rigid material. The casing portions 16, 18 may be thermally conductive. In one embodiment, the casing portions 16, 18 are metal. The casing portions 16, 18 are attached to form a version of the portable computer, which is shown in FIG. 9. As shown in FIG. 9, at least one of the casing portions 16, 18 may have at least one opening or window 20. This opening or window 20 exposes electrical connectors 22 of the portable computer 10, which allow the portable computer 10 to be connected to and interact with at least one reader (not shown). These connectors may be a grid of conductive targets. In the version of the portable computer shown in FIG. 9, the opening 20 is in the upper casing portion 16, however, it may be in the lower casing portion 18, on a side, etc. The casing may also have at least one means for attaching the casing to a rope, chain, string, etc. for easy transportation. Such means may be a hole or opening in the case or a hook or fastener attached to the casing. The encased portable computer 10 has length L1, width W1 and height H1. L1 may be about 50 mm to about 200 mm. W1 may be about 25 mm to about 100 mm and H1 may be about 1 mm to about 20 mm. In one version, L1 is about 80 mm, W1 is about 50 mm and H1 is about 4.5 mm. L1 may be about 82.55 mm. W1 may be about 51.52 mm and H1 may be about 4.41 mm.

The embedded integrated circuits and other electronic components on any version of the portable computer may be coated with the at least one coating. The coating should at least substantially cover the entire integrated circuits (or any single integrated circuit or portion thereof) and may be applied to both sides of a printed circuit board or multiple sides comprising integrated circuits and chips. The coating is comprised of a material that protects the integrated circuits from damage; for example, from water damage or from physical contact with objects that may damage the circuits. The coating should protect the electronic assembly or integrated circuit from damage due to contamination, moisture, fungus, dust and corrosion caused by harsh or extreme environments, etc. The coating material should also protect the integrity of the integrated circuit components (i.e., from tampering or improper accessing of stored data); for example, by hindering or preventing reverse engineering or removal of any circuit components. In particular, an epoxy coating may make the integrated circuit components or electrical equipment brittle so that any attempt to remove or tamper with the components would break or shatter the coated components. A laminate material may also be utilized.

The coating material should also protect the portable computer from damage from rough handling, installation, or reduction of mechanical and thermal stress. The coating may be a protective non-conductive dielectric layer that is applied onto the printed circuit board assembly. The coating may be substantially clear or it may be substantially or partially opaque. The coating may be hard or may have a rubbery or slightly rubbery texture. The coating may provide at least some thermal conductivity from the integrated circuits or electronic components. Where the coating is electrically insulating, thermally conductive elements, such as metals or semi-conductors may be included in the coatings to dissipate thermal energy. In addition, channels, openings, holes, etc. in the coatings may be provided to dissipate heat. Coatings that may be suitable include silicone, epoxy, acrylic, urethane and Paraxylene, as examples. Where an epoxy coating is used, the coating may disperse heat generated by the processor to thermally-conductive casing portions, where the heat may be dissipated via a chimney in the casing. Thus, in one embodiment, epoxy and a thermally conductive, for example, metal casing, provide protection of and heat dissipation from the portable computer.

In addition, any version of the portable computer may include security information in the software. The security information allows only authorized users to access certain information on the computer. Access information may include personal identification numbers, security questions, passwords, etc. The portable computer may also contain stored or baseline biometric information such as height, weight, blood type, voice and retinal patterns, fingerprints, pulse rate, etc. The portable computer or reader may comprise a Trusted Platform Module (TPM) chip, which will encrypt and encode both data files and software. Contents of the computer may not be accessible without a user providing matching biometric information, such as a fingerprint. Preferably, the portable computer reader or computer would comprise means for reading the biometric information. Such means include, but are not limited to, a pulse reader, fingerprint reader, retinal scanner, voice recognition recorder, etc. For example, the system may include biometric mice as an input, which includes an integrated fingerprint reader either in the receiver or the mouse. Such biometric information, readers, storage means etc., are disclosed in Applicant's U.S. patent application Ser. No. 11/054,519, the contents of which are incorporated by reference herein.

The portable computer may also contain at least one sensor configured to detect the portable computer's location and when the portable computer has left a specified area. The sensor may be embedded or otherwise attached to the epoxy, or provided at any other desired location in/on the portable computer. In particular, the sensor may be configured to track the position of the portable computer within a designated area. Such a sensor may cooperate with a tracking device. For example, the sensor may contain at least two parts. One is an integrated circuit for storing and processing information, modulating and demodulating a signal, for example, a radio frequency signal, and other specialized functions. The second is an antenna for receiving and transmitting the signal. Such a sensor may be a radio frequency identification (RFID) tag and the tracking device may be an RFID reader. The RFID tag may be "active" or "passive." The RFID tag may contain identifying information, such as the owner of the portable computer, serial number of certain parts, etc. The RFID reader comprises a module (transmitter and receiver), a control unit and a coupling element (antenna). The RFID reader may be part of a portable computer reader or may be stand alone. Communication between the tag and the reader may occur wirelessly. In addition, either or both of the tag or the reader may be adapted to emit an audible and/or visual signal, for example, when the tag is out of a specified range of the reader or when the tag is within a specified position relative to the reader. For example, if a user removes the portable computer from a designated area, a loud sound may be emitted by the portable computer.

In certain embodiments, the computer does not contain means for a user to interact directly with the computer. In other embodiments, the computer contains means for interacting therewith. By interacting directly it is meant that a user cannot access the software programs, hardware or other functionality such as sounds, visuals, etc., on the computer without a portable computer reader, which provides the means for accessing the computer, as described below.

As shown in FIGS. 4-7, such means for interacting with the computer may include a reader, which is preferably an input and output device. Such an input/output device may be, for example, a keyboard, display, mouse, speakers, etc. In one embodiment, the portable computer reader provides only means for a user to interact with or use the portable computer. The portable computer reader is a "shell" without the portable computer and, therefore, is inoperable for performing computing functions without the portable computer. Once the portable computer is connected to the portable computer reader, preferably, in a plug-and-play style, the system becomes a fully operational conventional computer capable of any known computing operation. When the portable computer is disconnected from the portable computer reader, the portable computer reader once again becomes a shell and the computer cannot be directly accessed unless re-connected to the portable computer reader or another portable computer reader.

As provided above, in one embodiment, the portable computer does not comprise means for a user to interact directly with the contents of the computer. For example, as shown in FIGS. 1-3, the portable computer does not have a display or monitor, a keyboard or keypad, voice input device, etc. Rather, such input devices are included on the portable computer readers. In other embodiments, the computer may have such input/output devices. For example, in one embodiment, the portable computer itself is a cell phone that can access the internet via a wireless network.

Figure 4:
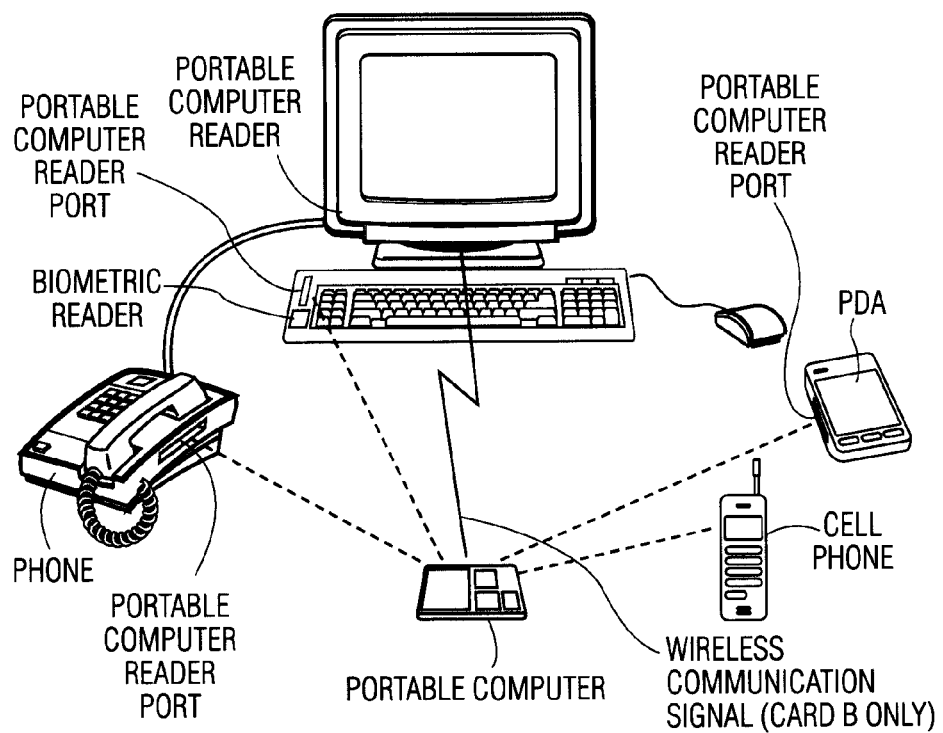
FIG. 4 is a perspective view of an embodiment of a computing system according to the present invention.
Figure 5:
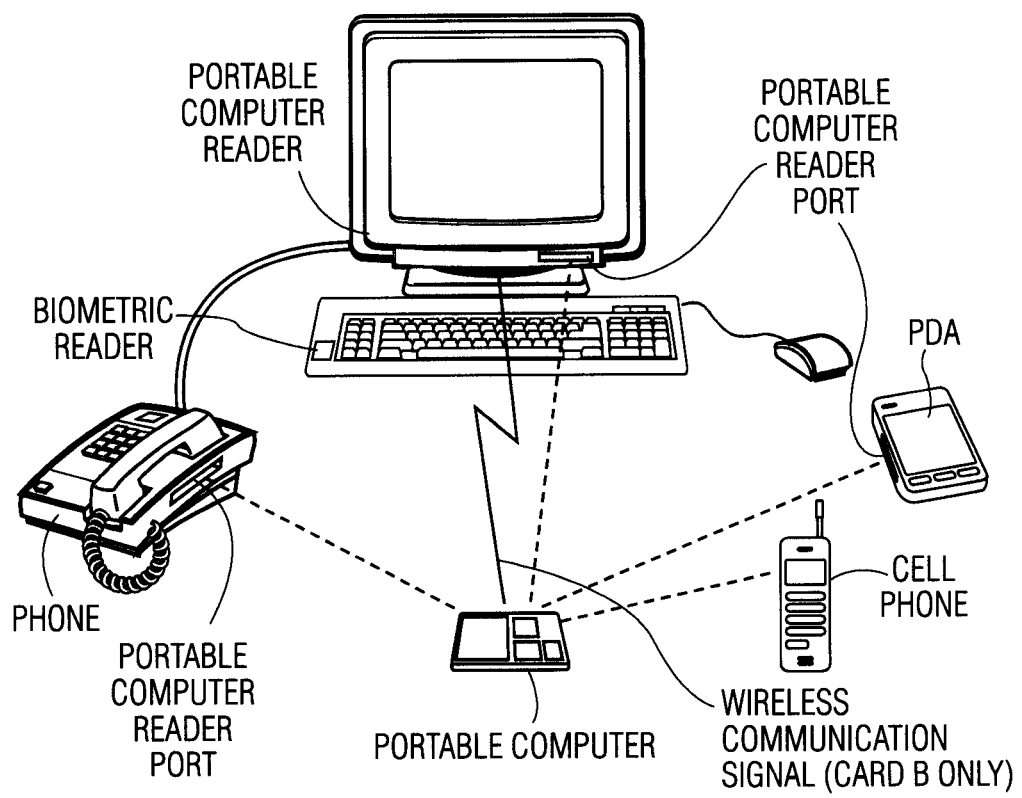
FIG. 5 is a perspective view of an embodiment of a computing system according to the present invention.
Figure 6:
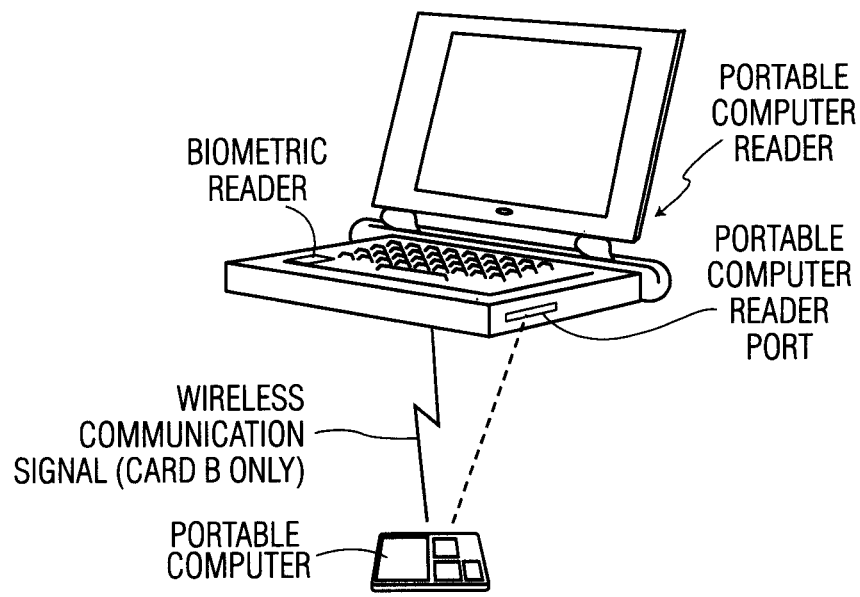
FIG. 6 is a perspective view of another embodiment of a computing system according to the present invention.

The portable computer preferably also has means for connecting to any portable computer reader, which means that it can be used virtually anywhere. "Connecting" refers to being attached or in communication with the portable computer reader by being affixed to, stored within or in operable communication with the portable computer reader. As shown in FIG. 2, the female connector may include one uniquely configured universal connector portable computer reader that mates with or fits against a power connector source or activating means in any of the portable computer readers in the system. As shown in FIGS. 4-6, the connecting means may also include a wireless connection between the portable computer and the portable computer readers. Thus, the portable computer may have a wireless transmitter and the portable computer readers have a receiver, or vice versa. The universal connector may be a USB-type connector. Regardless of the form of the connector, the connector will be configured to connect to every portable computer reader in the system and provide full computing function once connected. The means for communicating also provides communication or transfer of information over a bus or in a wireless fashion. Preferably, the computer and portable computer reader would support various wireless protocols including, without limitation, WiFi, Bluetooth™, Wymax, etc. For example, a wireless chip(s) may be contained on the card and/or portable computer reader to accommodate wireless communication with other devices or over the internet.

As provided above, and as shown in FIGS. 4-7, a computing system of the present embodiment also comprises at least one portable computer and a plurality of portable computer readers. In one embodiment, these portable computer readers are located at various locations that are spread out from one another so that a user can take his or her computer with him or her and use it in remote locations. For example, the portable computer readers can include readers located at central locations for access by numerous users, such as located in computer centers, libraries, universities, internet cafes and/or hotels, as examples. The main function of the portable computer reader is to allow a user to interact with the portable computer. In one embodiment, the portable computer reader is the only device that will allow a user to interact with the computer, which provides additional security. In other embodiments, the reader is configured to interact with portable computers other than those in the system.

As shown in FIGS. 4-7, generally, the portable computer reader comprises a housing. In various embodiments, the housing may be an input/output device itself. However, in other embodiments, the housing may be stand alone—i.e., a reader, which must be connected to an input and/or output device. The portable computer reader housing may be a component of a conventional desktop or laptop computer, such as a keyboard, monitor, tower, mouse, etc. In addition, the housing may comprise operating system support for dynamic hardware components and use an un-dock command to release drivers, which are no longer needed once the portable computer has been detached from a reader. Similarly, the portable computer may execute an undock command prior to entering hibernation—i.e., when shut down and in the processing of being withdrawn from a reader.

The housing may comprise a power supply, Ethernet port or WiFi and USB ports. In particular, the housing or readers may comprise at least one power generating unit with power generation components. The power supply unit may be configured to convert 100-120 V AC power from the mains to usable low-voltage DC power for the internal components of the computer. The power generating unit may conform with the ATX form factor. The power generating unit may be configured to turn on and off using a signal from the motherboard, and to provide support for modern functions such as a standby mode. The power generating unit may comprise a PC Main power connector for supplying power to the motherboard. The power generating unit may also comprise at least one ATX12V 4-pin power connector that goes to the motherboard to supply dedicated power for a processor. The power generating unit may also have peripheral power connectors. The power generating unit may also have auxiliary power connectors such as Serial ATA power connectors: a 5-pin connector for components which use SATA power plugs, which may supply power at three different voltages: +3.3, +5, and +12 volts; and a 6-pin connector—most modern computer power supplies include 6-pin connectors which are generally used for PCI Express graphics cards. The readers may comprise at least one electrical interface for transmitting power to at least one portable computer and the portable computer may comprises an electrical interface for receiving power from at least one reader. The electrical interface of the portable computer may be a plurality of gold-plated pads and the electrical interface of the reader may be a plurality of pins. The electrical interface from the portable computer to the reader should provide both high current power connections as well as high speed data connections. The connector is configured to hold up despite at least 10,000 connect/disconnect cycles. The connector may be a SAMTEC™ GFZ style connector, which may have about 100-900 pins. The connector body may be connected to the reader whereupon the portable computer connector would need only a pattern of gold-plated copper pads.

Optional items such as CD/DVD/BlueRay™ players could be implemented as a USB peripheral or be integrated using a high speed Serial ATA (SATA) interface. In other embodiments, the housing is connected to an input/output device. In the embodiment shown in FIGS. 4 and 5, the reader comprises substantially all the elements of a conventional desktop computer such as a keyboard, mouse, display, etc. a display or monitor, a keyboard and a mouse. As shown, it preferably, does not have a structure that would typically house a hard drive because the reader is, preferably, a shell without the portable computer. In other words, it does not contain the inner workings of a traditional desktop computer but contains the unique configuration of the readers of the present invention that allow the readers to interact with the computer but become a shell without the computer. The keyboard and display may be connected by any means known in the art, including a serial bus or wirelessly, for example, by Bluetooth. The mouse may connected by any means, including a USB connection. Where the reader is a portable computer, such as a laptop, the portable computer and reader may comprise a power notebook which has a faster CPU and where the reader connects to the portable computer via a SATA interface.

As also shown in FIGS. 4 and 5, the portable computer readers may include a PDA, a cell phone, or a LAN phone. Where the reader is a cell phone, the card itself has a SIM card so that a user can download information such as phone numbers to the computer. Where the reader is a cell phone, PDA, etc. it may include a custom application providing the interface to the phone that supports calling SMS and MMS transactions. In addition, special drivers may be included to adapt Windows to small, low resolution screens in some hand-held devices. The reader may also be WiFi enabled. Further, the reader may have a SIM card that can become a phone. In this embodiment, the input device is the keyboard, mouse or PDA touch screen or the PDA or phones' keypad. The output device is the various displays, speakers, etc.

In the embodiment shown in FIG. 6, the reader appears as a traditional laptop-type computer. The input device is the keyboard and the output device is the display, speakers, etc. It is noted that the structure supporting the keyboard, in one embodiment, does not contain the inner workings of a traditional laptop but contains the unique configuration of the readers of the present invention that allow the readers to interact with the computer but become a shell without the computer.

Figure 7:
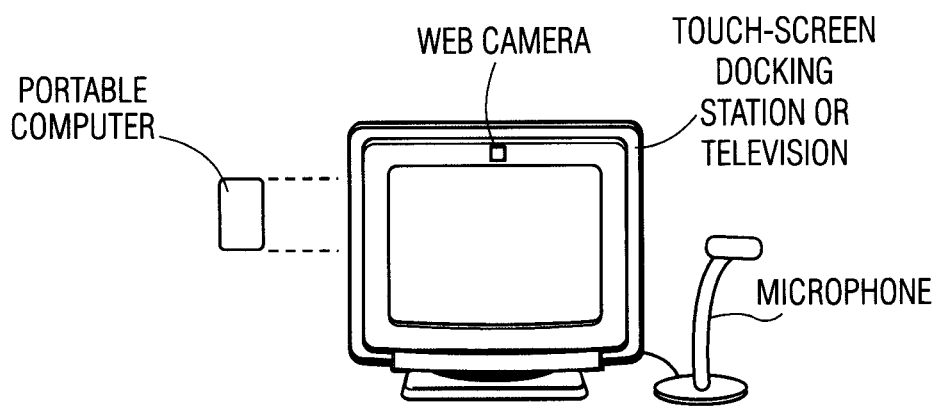
FIG. 7 is a perspective view of another embodiment of a computing system according to the present invention.

In the embodiment shown in FIG. 7, the reader is a touch screen, display or television. Thus, the screen may be the input or output device. Another input/output device may be a microphone. The readers may comprise additional input/output devices such as printers, optical drives, speakers, voice recognition hardware, etc. It would be understood that the reader may take many different forms, for example, it may be a "shell" of a CD or DVD player, radio, etc. In other embodiments, a monitor may be eliminated if desired depending on the application and/or other input devices may be utilized instead of a keyboard, such as a touch screen, voice activated input, etc. The portable computer reader may also be relatively stationary or portable, as may be desired.

In another embodiment (not shown), the reader may be a stand alone reader. The reader would include at least one connector for connecting to a separate input and output device. Such a connector may be a USB or SATA connector. The stand alone reader may also include a power supply as well as a biometric scanner. The stand alone reader may also comprise VGA, DVI and/or S-video formats.

The readers also comprise at least one connector for attaching the portable computer to the reader. In one embodiment, the connector is attached to the housing of the portable computer readers. In the embodiments shown in FIGS. 4-7, the connector is within a slot or hole for receiving the portable computer. The slot may be located anywhere on the reader, for example, on the keyboard, as shown in FIG. 4 or on the monitor, as shown in FIG. 5. The portable computer reader connector is configured to mate with any of the aforementioned universal connectors on the portable computer. The connector may include a bus as is known in the art.

In the embodiments shown in FIGS. 4-6, the portable computer reader (generally, card "B"), utilizes a wireless connection to attach to the portable computer, such as an Ethernet or FireWire. The wireless connection may include modems and network cards. These devices may also allow the portable computer to interact with other portable computers. The portable computer reader is configured to send input to and output from the operating system in the portable computer. In addition to the aforementioned connection, the portable computer has means for interacting and communicating with the portable computer reader.

As shown in FIGS. 4-6, the reader may include a biometric scanner or reader. Such a scanner may include a pulse reader, fingerprint reader, retinal scanner, voice recognition recorder, etc. The system may include biometric mice as an input, which includes an integrated fingerprint reader either in the receiver or the mouse. Such biometric information, readers, storage means etc., are disclosed in Applicant's U.S. patent application Ser. No. 11/054,519, the contents of which are incorporated by reference herein. In addition, the portable computer may include security information in the software. The security information allows only authorized users to access certain information on the computer. Access information may include personal identification numbers, security questions, passwords, etc. The portable computer may also contain stored or baseline biometric information such as height, weight, blood type, voice and retinal patterns, fingerprints, pulse rate, etc. In addition, every portable computer may be tied to a biometric fingerprint scanner, which identifies a given user as the owner of the portable computer. Thus, the fingerprint scan can identify whether the user is the licensee that purchased the portable computer.

Figure 8:
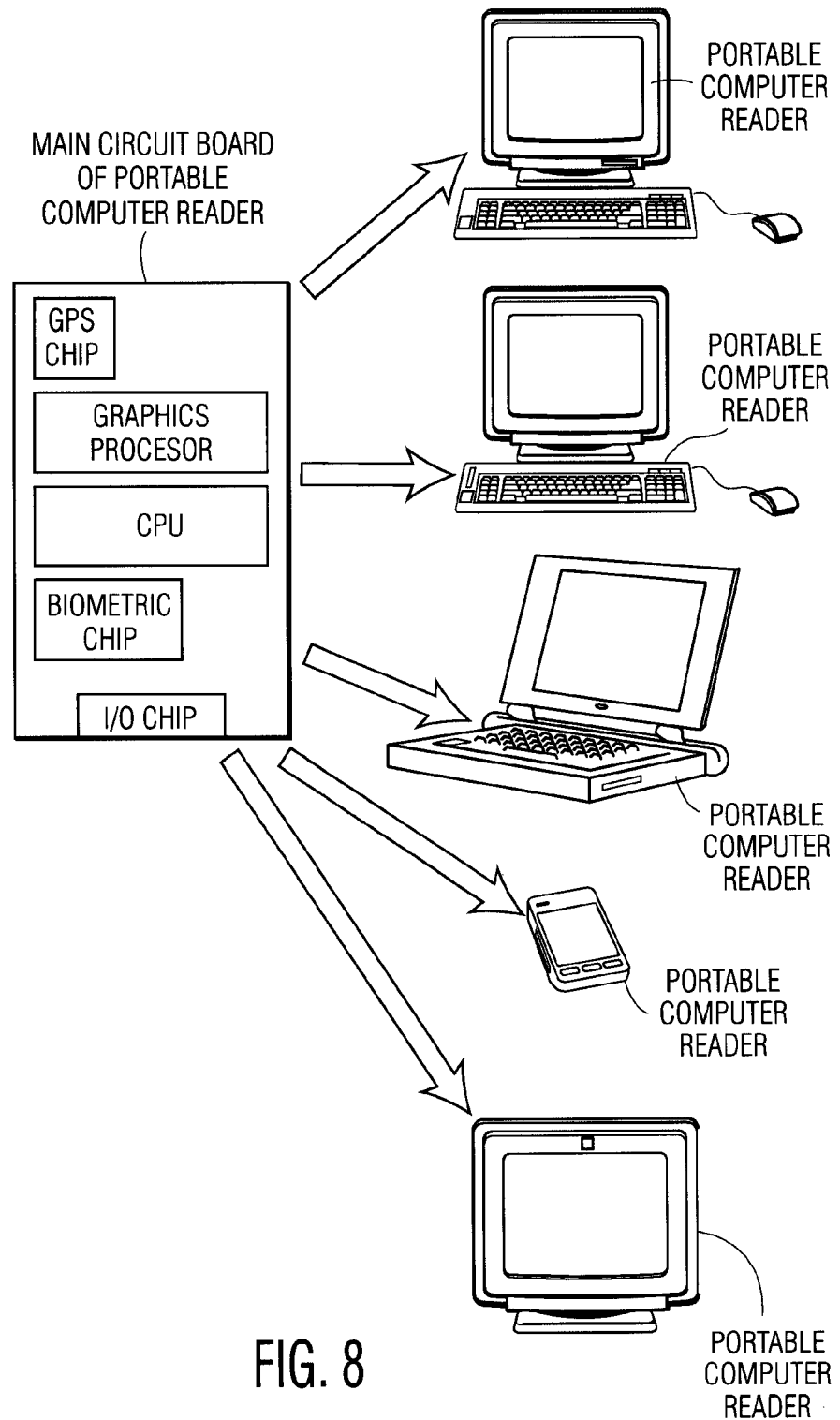
FIG. 8 is a perspective view of various embodiments of a portable computer reader according to the present invention.

As shown in FIG. 8, the portable computer readers preferably have a main circuit board comprising, at least, a GPS chip, graphics processor, CPU, biometric chip and an I/O chip. Internally, the housing of the portable computer reader may also include a heat sink/fan, video cards, PCI buses, etc. The housing may also include external bus controllers to connect to external peripherals, speakers, etc. In one embodiment, the portable computer reader supplies power and connections to the portable computer and peripherals. However, in other embodiments, the portable computer reader does not supply power. Rather, the power is supplied by batteries or another power source, such as solar power cell, coupled to or provided within the portable computer.

The portable computer reader may contain an AC or DC power source and a controller interfacing with the portable computer. Furthermore, location tracking may also be incorporated into the overall system where desired. For example, the reader may be equipped with required front end RF and conversion needed to support a single chip receiver and a global positioning system (GPS) processor in the portable computer. An RF feed may be utilized when the device contained on the card, such as an onboard processor, cannot receive energy from an onboard antenna. In one embodiment, when connected to a playback/send unit, an electrical path is created that connects the Antenna on the playback/send card reader unit to the single chip GPS solution. Power is then applied via the playback/send unit. Upon power-up and a time delay needed for the GPS signal to be processed, time and location information is available. This location and time information may also be used to time stamp designated or every transaction in the digital identification card. Furthermore, the playback/send unit may also contain a biometric fingerprint reader that allows correlation from user to stored biometric information on the card. Only a correct match will allow access to data on the computer.

In one embodiment, the portable computer reader is not completely a shell without the portable computer but includes storage with software loaded thereon for "searching" for a portable computer. Thus, after a device is inserted into the portable computer reader, the system will "search" automatically for a portable computer. Once the portable computer reader finds the portable computer, it substantially, immediately runs the computer programs. In other words, the computer does not need to boot up before it is operational. Rather, the portable computer is ready to work immediately similar to a digital camera. As provided above, the portable computer readers are inert or a shell as a general computing device until the portable computer is connected thereto. The portable computer may be arranged in certain embodiments so that it does not function and is not activated apart from the portable computer reader because the portable computer has all of the components of a conventional computer, except possibly a display and an input source, such as a keyboard/keypad, and may also include at least one connector to a direct power connection, and a communication bus. In these embodiments, the reader may comprise a CPU, a graphics processor and a GPS device, a sound card, a heat sink, storage, circuit board, etc.

In another embodiment, the portable computer is a card and the portable computer reader is a card reader, as set forth in Applicant's prior patent application Ser. No. 10/461,303 ('303 application). The card may be of any desired size and thickness, which may also be attributed to desired capabilities and technologies used, such as memory/storage requirements. As noted above, in certain embodiments, the card is preferably the size of a conventional credit card for easy transport. In addition, storage capabilities of the card can range according to the particular application for the portable computer. Current technologies would readily accommodate a gigabyte plus on the card and it is anticipated that a terabyte or more would also be capable of residing on the card. The card and reader may communicate using any of the means described above, such as over a cellular network. For example, the card and/or reader may incorporate the requisite components necessary to communicate over a cellular network. Alternatively, the card and/or reader may be connected to a cell phone either via a hard-wire connection or a wireless connection. The cell phone with card may then be used for full general computing functions such as accessing the internet, e-mail, word processing, etc. In this embodiment, the card and reader together comprise all of the elements of a fully functioning general purpose computer. In other embodiment, the card may be used in a card reader, which has a built in camera. The reader, with the card, is able to access the internet to download music, movies, television shows, etc. The reader also may include a GPS system and biometric scanners or readers. Where the reader includes a biometric reader, it sends the biometric data to the portable computer for later processing and comparison. Preferably, the card has software that "times-out" the downloaded programs and, therefore, makes them unusable after a certain period of time. For example, a user may be able to download a movie and then will have a certain period of time in which to view the movie. Once that time expires, or when the user has viewed the movie, it will automatically be deleted from the card, reader or phone. In another embodiment, the user is able to download pre-paid calling minutes to the system. Similarly, the system is capable of automatically deleting any downloaded items if the user violates pre-set terms.

In one embodiment, the computer and portable computer reader form a memory device, such as the identification card described in Applicant's U.S. Pat. No. 7,139,914 ('914 patent) and '303 application, which are incorporated by reference herein, in their entireties. A separate reader, such as those described in the '914 patent and '303 application, may be used to read the information on the identification card. For example, the portable computer may have electronic files that store personal and biometric information. The reader is configured to read the biometric information stored on the portable computer. The portable computer may also comprise a GPS system or location system that may communicate by wireless means with a reader in the form of a scanner, when the card is brought into proximity with the scanner, as described in the '914 patent and '303 application. Information may also be transferred from the identification card (portable computer and the portable computer reader), as described in the '914 patent and '303 application.

In another embodiment, once the portable computer is connected to the portable computer reader, the system becomes a personal digital voice recorder for persons, including but not limited to medical patients and children. In this embodiment, the recorder stores real time voice data, such as non-volatile memory. Recording may start at any desired times, such as by a parent, utilizing the playback/send unit. The recorder may then be attached to a user, such as a child or patient, and all proximity sound to the child or patient is recorded until either a low power condition or a memory full condition is reached. The memory may be scalable according to the amount of recording time and fidelity desired by the parent or authorized custodial person.

In another embodiment, once the portable computer is connected to the portable computer reader, the system becomes an automatic voice notebook, such as for health care professionals on rounds as an example. Similar uses, such as by building inspectors, maintenance or security and Military personnel, as an example, are also anticipated. In this embodiment, memory, such as non-removable, non-volatile memory, such as flash memory, may be used to store encrypted digital data in the record unit. A small cell may be used in this unit to keep size and weight to a minimum. A real-time clock may be embedded in the record unit to be used for time stamping the recorded voice segments. The record unit may have a connector, such as along its bottom surface, which interfaces with a separate playback unit, such as when the record unit is inserted into a recessed opening in its top surface. The playback unit may include conventional features, such as speaker, play button, volume control and "forward/reverse" switch for navigating within the data. Both the record unit and the playback unit may further have identifying features, such as matching bar codes on their housings, which can be used to identify the individual units in case of loss or to confirm identity.

In another embodiment, the portable computer can operate as a backup system to a conventional computer. For example, the portable computer may be connected via a portable computer reader or other wired or wireless connector, such as a USB or FireWire port, to the conventional computer, in order to upload data and other information stored on the conventional computer. In addition, in other embodiments, the portable computer may operate as a primary computing system when connected to a portable computer reader, such as a shell comprising a monitor and keyboard. In still other embodiments, the portable computer may be switched as desired between operating as a backup system or as a primary computing system, as described above. Further, in these and other embodiments, information stored on the portable computer may be downloaded onto another computing system where desired when connected to the portable computer, such as via the USB or FireWire port described above, or any other wired or wireless means.

In the operation of one embodiment, a user connects a card reader/writer to his or her home or office computer. This is a fully functional computer as in known in the art. The user then inserts a "blank," or new portable computer (for example, Computer "A," "B," or "C") into the card reader/writer. Through application software, the user then is prompted to download virtually all information from the home or office computer onto the portable computer. This includes all programs, operating system, etc. The user is then prompted to provide identifying biometric information such as a fingerprint or retinal scan. This "baseline" information is stored in the portable computer's memory such that only a user with a match of such information may interact with the portable computer. A user is then able to remove the portable computer and take it with him or her. The user then may connect the portable computer with the portable computer reader, which, as provided above is a shell until the portable computer is connected. Once the portable computer is connected to the portable computer reader, the reader automatically searches for the computer. Once it finds the computer, the user must log-on by inputting biometric information. If the information matches, the user is able to interact with the portable computer. Thus, the present invention allows a user to securely use his or her computer virtually anywhere.

The present system provides many advantages. First, because the portable computer is capable of being operated on almost any portable computer reader, it allows a user to transport essentially an entire computer easily for use anywhere. For example, the portable computer may be the size of a credit card, so as to be easily carried in a user's pocket or wallet. And, as provided, the portable computer is capable of performing virtually any computing function once connected to the portable computer reader. Thus, various embodiments of the present invention is not dependent upon a chassis for computing functions such as data retrieval, operating software application, software and video interface. Rather, all of these functions and applications are contained on the portable computer. Examples of the present invention contains all of the storage, processing, video interface and software in the portable computer which allows it to be used with any housing without concern for the version of operating software, application software or video setting. A user can easily carry the portable computer, place within or attach it to a portable computer reader, and then compute as is known in the art. This may include accessing the internet, e-mail, drafting and saving documents, sending and receiving all types of data, including pictures, video and text, etc. For example, the portable computer reader may comprise the required software and hardware for accessing the internet, such as modem and Internet Protocol ("IP") address. In other embodiments, these devices may be provided on the portable computer. An advantage of various embodiments is that many hardware and software components that are required for conventional computer operation can be contained within the portable computer reader, which enables the portable computer to contain minimal components, which benefits in that the portable computer can be small in size, cost economical to produce and durable. The portable computer acts as the brain and the portable computer reader operates as the body which will perform the functions. However, without the brain, the body will do nothing. When the user is finished computing, he or she simply removes the portable device and can take it with him or her. Because the portable computer reader is a shell, none of the user's information is left behind. Thus, various embodiments of the present invention do not make any information, including sensitive information, available to subsequent users of the shell computer. In addition, there is virtually no danger that the portable computer reader could be affected by a computer virus for this same reason, as there is no capability for the portable computer reader to retain any data from a previous person's use. As a result, the applications for the portable computer are almost limitless where security and privacy of content is a concern, and where there may be concern of corruption by viruses or worms. For example, applications include, but are not limited to, hotels, internet cafes or other public locations, such as libraries or universities, etc. Further, the various embodiments of the present invention provides the portability of a "Pocket PC" with the advantages of a traditional computer. For example, the portable computer is easily transportable and the portable computer reader provides use of a full computer such as a full-sized screen, larger keyboard, etc. that are not available with traditional Pocket PC-type computers. Finally, there is substantially no boot up time with various embodiments of the present invention, due to the arrangement and/or nature of technology utilized. For instance, in certain embodiments, the portable computer may comprise one or more flash memory devices or flash drives. A flash drive is a storage device that uses flash memory rather than conventional spinning platters to store data. The flash drives tend to physically imitate conventional hard drives in performance. The motivation to call it a "drive" comes from the fact that it is serving the purpose of a part that has traditionally been mechanically driven. However, note that nothing is being mechanically driven in a flash drive. Advantages of using flash memory or flash drives with the portable computer is there is little delay time when starting up, such as is the case when booting conventional computers, which drivers take time and also various hardware and software components are checked before the computers are able to be operated by a user. Also, flash memory is non-volatile, which means that it does not need power to maintain the information stored in the device, and as a result, the portable computer in many embodiment requires only low power for operation, which can be readily supplied by batteries or similar low power sources, such as solar cells. The flash memory can also be tailored to provide as much storage capacity as may be desired depending on the particular application.

In addition, as various embodiments of the portable computer can be comprised of minimal components, since the portable computer reader would take up the remainder of the components, such as the monitor and keyboard of a shell computer referenced above, the costs of the portable computer would be greatly reduced over the costs of conventional computing systems. Moreover, use of cost efficient technologies, such as flash memory, can further reduce the costs of the portable computer. As a result, the portable computer in certain embodiments may be viewed as a disposable device due to the cost efficiencies. Also, the small size would result with the device being more environmentally friendly even if disposable as compared to conventional computers. In other embodiments, due to the cost efficiencies, businesses can utilize the portable computer as promotional items, which are provided to users at no cost, or provided to a user who may purchase a related product, such as operating system software, i.e. Windows, or for subscribing to a designate service, such as an internet service provider. In these embodiments, the portable computer reader, i.e. the monitor/keyboard or reader, can be supplied by the business for use with the portable computer or purchased by the user. In addition, in other examples, portable computers may be provided at no or minimal charge to students or employees, who would be able then to use the portable computer with portable computer readers located at designated areas provided by the school, university, business or government, as examples.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A computing system comprising:
    a portable smartcard computer for use with a reader, the portable smartcard computer comprising:
        at least one storage component;
        at least one processor;
        at least one controller hub;
        at least one printed circuit board comprising at least one integrated circuit;
        at least one connector adapted to connect to at least one reader; and
        a substantially rigid epoxy coating substantially enclosing the at least one storage component, the at least one processor, the at least one controller hub and the at least the printed circuit board, the substantially rigid epoxy coating having at least one window for exposing the connector; and
    one or more readers each comprising:
        a housing; and
        at least one connector for connecting to the portable smartcard computer,
        wherein the portable smartcard computer excludes means for a user to interact directly with the portable smartcard computer,
        wherein the housing comprises at least one input device and at least one output device that facilitates direct user interaction with the portable smartcard computer, and
        wherein the one or more readers have no user application processing CPU and are configured only to power the portable smartcard computer and to route input and output signals of the portable smartcard computer.

2. The computing system of claim 1, wherein at least one of the one or more readers comprises a power generating unit.

3. The computing system of claim 1, further comprising an RFID reader and wherein the portable smartcard computer comprises an RFID tag configured to interact with the RFID reader.

4. The computing system of claim 1, wherein the at least one input device is selected from the group consisting of: a keyboard, a keypad, a touch screen, a webcam, a microphone, a video recorder, and a PDA and the at least one output device is selected from the group consisting of: a display and at least one speaker.

5. The computing system of claim 1, wherein the one or more readers are configured so that they will not operate with a computer other than a portable smartcard computer of said computing system.

6. The computing system of claim 1, wherein the portable smartcard computer is capable of being used with every reader in the computing system.

7. The computing system of claim 1, wherein the at least one connector of the portable smartcard computer comprises a grid of conductive targets.

8. The computing system of claim 1, wherein at least one of the one or more readers comprises at least one biometric scanner selected from the group consisting of: a fingerprint reader, retinal scanner, and pulse reader.

9. The computing system of claim 1, wherein the housing comprises an operating system support for dynamic hardware components and wherein the housing and the portable smartcard computer execute an un-dock command to release drivers, which are no longer needed once a portable smartcard computer is detached from at least one of the one or more readers.

10. The computing system of claim 1, wherein at least one of the one or more readers comprises at least one electrical interface for transmitting power to the portable smartcard computer and wherein the portable smartcard computer further comprises an electrical interface for receiving power from the at least one reader.

11. The computing system of claim 10, wherein the electrical interface of the portable smartcard computer comprises a plurality of gold-plated pads and wherein the electrical interface of the at least one reader comprises a plurality of pins.

12. The computing system of claim 1, wherein when the portable smartcard computer is connected to at least one of the one or more readers, the computing system is configured to access the internet and at least one of sending/receiving email and stream or download to the portable smartcard computer, music, movies or television shows.

13. The computing system of claim 1, wherein at least one of the one or more readers comprises a display and speakers.

14. The computing system of claim 1, wherein at least one of the one or more readers comprises a television screen.

15. The computing system of claim 1, wherein the at least one storage component is comprised of at least one single-level cell solid state memory.

16. The computing system of claim 1, wherein the at least one storage component is comprised of at least one multi-level cell solid state memory.

17. The computing system of claim 1, wherein the at least one storage component is comprised of at least one volatile memory.

18. The computing system of claim 17, wherein the at least one volatile memory is dynamic random access memory.

19. The computing system of claim 18, wherein the dynamic random access memory is DDR2.

20. The computing system of claim 1, wherein at the one processor is procured in bare die form.

21. The computing system of claim 1, wherein the at least one printed circuit board is configured as an eight layer stack-up.

22. The computing system of claim 1, wherein the at least one integrated circuit is connected in a flip chip configuration.

23. The computing system of claim 1, wherein the at least one controller hub is mounted in a flip chip ball grid array configuration and comprises 1249 pins.

24. The computing system of claim 1, wherein the portable smartcard computer is about 4 mm in height, about 83 mm in length and about 52 mm in width.

25. The computing system of claim 1, wherein the coating is selected from the group consisting of epoxy, silicone, acrylic, urethane and paraxylene.

26. The computing system of claim 1, wherein the portable smartcard computer comprises only volatile memory and is configured to save the contents of its volatile memory to flash memory in a hibernation process.

27. The computing system of claim 1, wherein the at least one printed circuit board has a density of about 8 GB to about 128 GB.

28. The computing system of claim 1, wherein the portable smartcard computer is no larger than 90.00 mm×60.00 mm and is no thicker than 6 mm thick.

29. The computing system of claim 1, wherein the portable smartcard computer is no larger than 82.00 mm×52.00 mm and is no thicker than 4.3 mm thick.

30. The computing system of claim 1, wherein the portable smartcard computer comprises a length L, a width W and a height H, wherein L is in a range between about 50 mm to about 200 mm, W is in a range between about 25 mm to about 100 mm and H is in a range between about 1 mm to about 20 mm.

31. The computing system of claim 1, wherein the at least one connector for connecting the one or more readers to the portable smartcard computer is a wired or wireless connection.

32. The computing system of claim 1, wherein the one or more readers and the portable smartcard computer are connected in at least one of direct physical contact or a contactless connection to enable communications between the one or more readers and the portable smartcard computer.

33. The computing system of claim 1, further comprising a slot in the housing that is configured to receive the portable smartcard computer, wherein the at least one connector for connecting to the portable smartcard computer is within the slot.

34. The computing system of claim 1, wherein the portable smartcard computer is selected from the group consisting of a compact disc, a cell phone, a personal digital assistant and a smartphone.

35. The computing system of claim 1, wherein the housing further comprises:
 the at least one output device comprising a visual display monitor and a first major plane; and
 the at least one input device comprising a second major plane, a first portion with a keyboard and a second portion with a portable device receiving area having the at least one connector for connecting to the portable smartcard computer,
 wherein said at least one output device is pivotally connected to said at least one input device by a connector such that said at least one output device may be moved relative to said at least one input device between a closed position, in which said first major plane extends substantially in parallel to said second major plane, and an open position, in which said first major plane extends transversely to said second major plane.

\* \* \* \* \*